United States Patent [19]

Winser

[11] Patent Number: 4,924,415

[45] Date of Patent: May 8, 1990

[54] APPARATUS FOR MODIFYING DATA STORED IN A RANDOM ACCESS MEMORY

[75] Inventor: Paul A. Winser, Redhill, United Kingdom

[73] Assignee: U.S. Philips Corporation, New York, N.Y.

[21] Appl. No.: 225,336

[22] Filed: Jul. 28, 1988

[30] Foreign Application Priority Data

Aug. 7, 1987 [GB] United Kingdom ............... 8718807

[51] Int. Cl.$^5$ ............................................. G06F 15/68
[52] U.S. Cl. ..................... 364/522; 364/521; 364/518; 340/750
[58] Field of Search .............. 364/521, 518, 522; 340/724, 706, 747, 750, 723; 382/41

[56] References Cited

U.S. PATENT DOCUMENTS

| | | | |
|---|---|---|---|
| 4,609,993 | 9/1986 | Shimizu | 364/522 |
| 4,625,289 | 11/1986 | Rockwood | 364/522 |
| 4,748,572 | 5/1988 | Latham | 364/518 |

OTHER PUBLICATIONS

A. Masahide Ohhashi et al., "THPM 12.7: A 32b 3-D Graphic Processor Chip with 10M Pixels/s Gouraud Shading", ISSCC 88 (2/18/88), 1988 IEEE International Solid-State Circuits Conference, pp. 168–169.

Newman & Sproull, *Principles of Interactive Computer Graphics*, pp. 369–371 McGraw-Hill, 1979.

*Primary Examiner*—Gary V. Harkcom
*Assistant Examiner*—Phu K. Nguyen
*Attorney, Agent, or Firm*—Anne E. Barschall

[57] ABSTRACT

Input data defines the address (X,Y), and an input color (RGB) and depth (Z) for a picture element (pixel) within a stored image. In order to perform hidden-surface removal (HSR), current depth values are stored for each pixel and compared with the input depth value to determine whether or not input data should be written to define a new color and depth for the pixel at (X,Y). The color and depth values are stored in a color RAM (9) and z-RAM (64). To obtain a speed advantage when modifying a series of consecutive pixels and one row of the RAMs, the current depth values are read and compared in advance for each pixel, during the writing period of one or more preceding pixels. The apparatus comprises a control and arithmetic unit (42), and a HSR control circuit (60) in addition to the color RAM (9) and z-RAM (64). The apparatus uses readily available video DRAM chips to provide a z-RAM with two data ports (62,66). The apparatus may form part of an electronic graphics system.

11 Claims, 5 Drawing Sheets

4,924,415

APPARATUS FOR MODIFYING DATA STORED IN A RANDOM ACCESS MEMORY

BACKGROUND OF THE INVENTION;

1. Field of the Invention

The invention relates to an apparatus for modifying data stored in a random access memory, the data corresponding to one or more rows of pixels of a stored image, the memory comprising a first memory (colour RAM) for storing a colour value for each pixel and a second memory (z-RAM) for storing a depth (z) value for each pixel, the apparatus comprising:
- means for receiving input data defining addresses, colour values and depth (z) values for a series of pixels;
- means for selecting each pixel in the series in turn and synchronously generating successive addresses, input colour values and input z-values;
- means for applying the address of each selected pixel to address inputs of the z-RAM and colour-RAM;
- means for reading from the z-RAM the current z-value for each selected pixel;
- means for comparing the current z-value with the input z-value for each selected pixel;
- means for writing the input z-values for each selected pixel into the addressed location of the z-RAM and for writing the input colour values into the addressed location of the colour-RAM, said means being responsive to an output of the comparing means so as to enable the writing of the input colour value into the colour-RAM and the input z-value into the z-RAM, to define a new colour value and a new z-value for a given selected pixel if the input z-value represents a lesser depth than the current z-value for that pixel.

The invention further relates to an electronic graphics system including such an apparatus.

2. Related Art

An apparatus as set forth in the opening paragraph is known in the art of electronic graphics generation and is used for performing hidden surface removal (HSR) for the two-dimensional display of data representing three-dimensional objects. The apparatus employs a 'depth-buffer' or 'z-buffer' algorithm, as described for example in 'Principles of Interactive Computer Graphics' by W. M. Newman and R. F. Sproull, at pages 369 to 371.

Three-dimensional models are created and stored, for example in a computer, and then scan-converted into two-dimensional colour information for storage in a random access memory or frame buffer. Once all the objects to be shown have been converted, the frame buffer (colour RAM) is read out according to a raster-scanning pattern, to drive a display device, such as a cathode ray tube (CRT). Unless the three-dimensional objects are converted and stored in a strict order of decreasing depth into the scene to be represented, hidden surface removal (HSR) is required to ensure that objects in the foreground are not overwritten in the colour-RAM by objects which are meant to be in the background but are converted later.

In z-buffer HSR, an additional memory (z-RAM) is provided to store current depth values for every pixel stored in the colour-RAM, so that incoming object data can be compared to see if it is in front of (visible) or behind (not visible) any objects already plotted at that pixel location. Only if the incoming object is visible will the old colour data be overwritten, and of course the input depth value becomes the new current depth value.

Such an algorithm can of course be implemented in computer software, but for high speed operation it is generally necesary to perform the HSR in hardware, at the time of scan-conversion.

Apart from the extra memory required for the z-buffer (which is, in any case, a diminishing burden with new low-cost high-density semiconductor memory chips) z-buffer HSR has the disadvantage of slowing down the rate at which pixel data can be written. This is because, rather than just writing each pixel colour value as it is supplied, the HSR hardware must (i) read the current z-value, (ii) compare the z-values and only then (iii) conditionally write the new z-value and the new colour value. Each memory cycle (i) and (iii) takes a finite time, as does the comparison (ii).

SUMMARY OF THE INVENTION

It is an object of the invention to enable the provision of an apparatus for implementing hidden surface removal which enables a faster pixel writing rate to be achieved.

One way of achieving that object would be to use faster memories, but faster memories are of course more expensive and the types of fast memories used for example in military and large industrial electronic graphics applications are too expensive for use in many fields of application.

It is a further object of the invention to enable the provision of an apparatus as set forth hereinbefore at a cost compatible with consumer and small business applications.

The invention provides an apparatus as set forth in the opening paragraph, characterised in that the z-RAM comprises a main random access array and a serial access memory and in that the apparatus further comprises means responsive to the input data for transferring the z-values for all pixels in the series from the main array of the z-RAM into the serial access memory of the z-RAM so that in operation, while the input values for the given pixel are being written into the colour-RAM and z-RAM, the means for reading the current z-value is enabled to read the current z-value of a succeeding pixel in the series from an output of the serial access memory.

By overlapping the performances of the reading operation with that of the writing operation for a preceding pixel the time taken to perform the method can be made on average less than the total of the times taken to perform the individual steps of the method for every pixel in the series. The basis for this is the recognition that for the great majority of input pixels, it can be predicted what the address of the next input pixel or pixels will be. Consequently, the current z-value for each input pixel can be read and compared with the input z-value for that pixel in advance, during the write cycle of a preceding input pixel. The address is known in advance because it is conventional for the scan-conversion to convert each object into raster-scan format by dividing the surface of the object into strips which correspond to series of consecutive pixels in rows of the memory (which rows conventionally correspond to lines of pixels on the displayed image). Of course, such a saving is not possible for the first pixel in each series, but since the series will typically contain tens or hundreds of pixels, the use of pipelining can substantially reduce the cycle time overhead for HSR.

Memory chips with a main random access array and a serial access memory (SAM) built-in are known as video-RAM or VRAM chips and for a fuller explanation of their construction and operation the reader is referred to the manufacturer's data sheets for such devices. Examples are the Hitachi HM53461P VRAM and the Fujitsu MB81461 VRAM. These known VRAM chips are designed for use as frame buffers (such as the colour-RAM) and allow the colour information in a main random access array to be updated at the same time as the memory is being scanned for the output to the display. In that application, entire rows of pixel data, corresponding to all or part of a display line, are transferred in parallel to the SAM, which comprises a shift register. The data bytes are then shifted in turn to a serial access port at the display pixel rate, while normal read/write access to the main array can proceed independently via a main data port.

The invention is based on the recognition that it is possible to use these known VRAM chips to implement a pipelined depth buffer for HSR, if the serial access port is used synchronously with the writing operations to the main array to extract the current z-values from the main z-RAM array rather than for repetitive display refresh purposes. This avoids the need for expensive fully-dual ported memories so that such an apparatus can offer a level of performance hitherto reserved to high-end professional and military applications at a cost more compatible with consumer and small business applications.

The invention is also compatible with the technique known as 'interleaving' whereby odd and even pixels in the row are assigned to two separate memories operating in parallel. This enables a further doubling of the pixel writing rate to be achieved. The process could in principle be extended to the use of three or more interleaved memories, but in practice synchronisation becomes increasingly difficult.

The succeeding pixel may be the next pixel in the series. However, if the combined time for the read and compare operations for each pixel is longer than that for a writing operation, it may be advantageous if the succeeding pixel is the second next pixel, for example. Similarly, if two (or three or more) parallel memories are being used for interleaving, the succeeding pixel will generally be the second (or third etc.) next pixel, as those skilled in the art will readily appreciate.

The means for applying the address of each selected pixel may include means for applying clock signals to the serial access memory to make the current z-value for each successive pixel available in turn at the output of the serial access memory.

The comparing means may comprise a digital comparator having a first input connected to the means for generating the successive input z-values and a second input for connection to the output of the serial access memory of the z-RAM. The apparatus may comprise means for connecting an output of the comparator to write-enable inputs of the z-RAM and colour-RAM. The use of a digital comparator, constructed for example from TTL or fast TTL comparator circuits such as Signetics' 7485/74F85, provides a simple and economical embodiment of the comparing means.

The apparatus may comprise one or more clocked latches for synchronising data applied to the colour-RAM and z-RAM with the signals applied to the address inputs of the colour-RAM and z-RAM respectively and with signals applied to control inputs of those RAM's. This allows the means for generating the input data and address values to operate substantially independently of the detailed synchronisation of the subsequent operations of the apparatus. The latches may be constructed for example out of readily available TTL or fast-TTL chips.

The apparatus may comprise a sequencing circuit for applying control signals to the colour-RAM and z-RAM synchronously with the selection of the pixels of the series. The sequencing circuit may for example comprise a custom or semi-custom integrated circuit, or a field-programmable logic sequencer (FPLS) integrated circuit with perhaps some additional logic.

The colour-RAM may comprise a main random access array and a serial access memory, the means for writing the input colour values into the colour-RAM being arranged for connection to the main array of the colour-RAM, the apparatus further comprising a picture output arranged for connection to the output of the serial access memory of the colour-RAM. The colour-RAM and z-RAM may comprise one or more identical integrated circuit memories. The use of identical memory chips to construct both the z-RAM and colour-RAM avoids the need to generate signals conforming to different interface requirements since common signals can be used by both for a substantial portion of the operations required, while the serial access port of the colour-RAM can be used for its intended purpose as a display output without interfering with the HSR.

The invention still further provides an electronic graphics system including an electrical circuit apparatus in accordance with the present invention. Such a system may be used in many of the applications normally associated with electronic or computer graphics systems, such as computer-aided design, computer simulations, entertainment, in which the use of the present invention enables provision of capabilities previously only available in more expensive systems.

BRIEF DESCRIPTION OF THE DRAWING

Embodiments of the invention will now be described, by way of example, with reference to the accompanying drawings, in which.

DETAILED DESCRIPTION OF THE PREFERRED EMBODIMENTS

Figure 1:
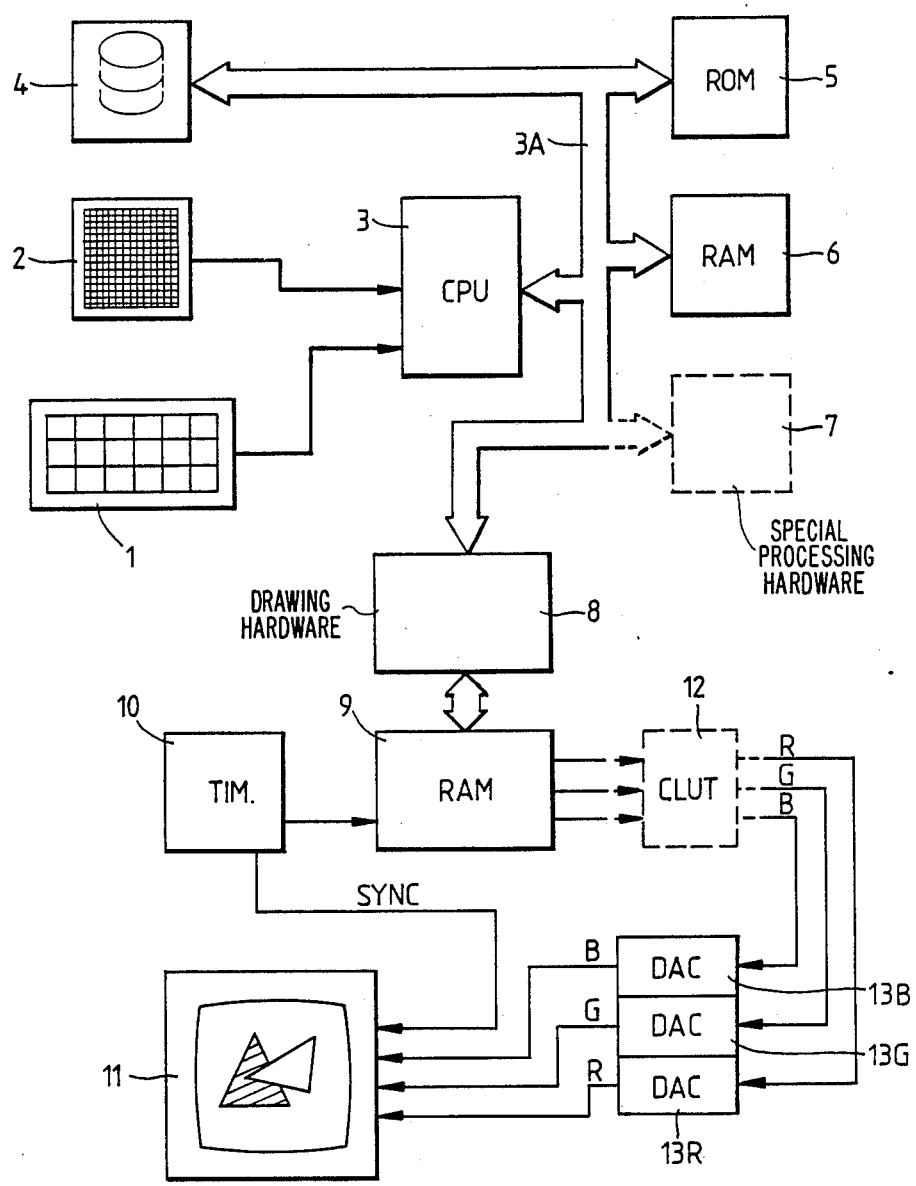
FIG. 1 is a schematic block diagram of an electronic graphics system in accordance with the present invention.

FIG. 1 is a block diagram of a graphics system in accordance with the present invention. A keyboard 1 and graphic digitiser tablet 2 provide input from a user to a central processing unit (CPU) 3. The graphic tablet may be used for 'drawing' input images to be manipulated by the system, in a known manner. Other input devices may also be used, of course, such as a joystick, trackerball or a 'mouse'. Such devices may also be used to manipulate images created by rotating, zooming etc.

In general, such devices are more convenient to use than a conventional keyboard alone.

The CPU 3 is also connected via a bus 3A (for example a VME bus) to a disc store 4, a ROM 5 and a RAM 6. The disc store, which may include magnetic floppy discs, hard discs, and/or optical memory discs, is used for storing data (for example complete or part images, or sequences of images) which can then be recalled and manipulated to generate new images as desired. Such data may include the user's work from previous input sessions, but it may also include commercially generated data, for example images for use in interactive computer-aided design or computer simulations. To allow modelling of three dimensional objects, such data will generally be stored as polygonal model data rather than in the form of two-dimensional images. In that case, the data corresponds to a three-dimensional model containing objects which are typically broken down into groups of polygonal surfaces in a three-dimensional co-ordinate space (triangular or quadrilateral surfaces for example). The data for each object in the model comprises a list giving the position and nature of every polygon that goes to make up the object, including the relative positions of its vertices and the colour, or 'texture' or transparency of the polygon surface.

The CPU 3 and the other components of the system then translate this three-dimensional model 'world' into a two-dimensional view for the user, from whatever viewpoint the user chooses.

The ROM 5 and RAM 6 provide programme memory and workspace for the CPU 3, which may comprise a microprocessor, such as a Motorola MC68020. Special processing hardware 7 may be provided to assist the CPU 3 to perform the large number of arithmetic operations required to convert all but the simplest models into a two-dimensional scene. The operations required of a typical system will be described hereinafter, with reference to FIG. 2. The hardware 7 may comprise TTL arithmetic circuits, connected to the CPU 3 via a VME bus connection, or it may alternatively include custom-built or programmable digital signal processing (DSP) integrated circuits. The nature of the hardware 7 (if required at all) will depend on the requirements of the system, for example with respect to speed, resolution, number of polygons per scene, etc.

Drawing hardware 8 is connected between outputs of the CPU 3 and inputs of a display RAM 9. The RAM 9 stores pixel data in raster-scan format, and the data includes three colour values for each pixel. The colour values stored could typically be three 8-bit values (total 24 bits) corresponding to red (R) green (G) and blue (B) components of the desired image, but in other embodiments, the 24 bits might define the same colour encoded as HSV (Hue, Saturation, Luminance) values, which simplifies calculations of lighting effects as is known in the art. Other colour coding systems such as YUV or YIQ (Luminance plus two colour-difference signals) could also be used if desired. For simple monochrome images, of course, a single grey-scale value of say 8 bits would be all that is required.

A timing unit 10 generates signals to co-ordinate the transfer of the pixel data within the RAM 9 to a display screen 11. In response to these signals, the locations in the RAM 9 are scanned row by row and column by column and the colour values read are fed to a colour look-up table (CLUT) 12. The CLUT 12 need not be provided if RGB values are stored, but if one of the other colour codes is used as described hereinbefore, the CLUT translates the 24-bit colour signal (HSV,YUV etc.) for each pixel into the equivalent three 8-bit RGB signals, which are then input to three 8-bit digital to analogue converters (DACs) 13R,13G,13B. The analogue outputs of the DACs drive a cathode-ray tube (CRT) display screen 11, which, directly or indirectly, receives timing signals (SYNC) from the timing unit 10, so that the CRT beams scan the screen line by line, pixel by pixel, in step with the scanning of the RAM 9. In other embodiments, according to display requirements, the CRT display could clearly be replaced by a different type of display device, for example a liquid crystal display (LCD) or a projection-type display.

Figure 2:
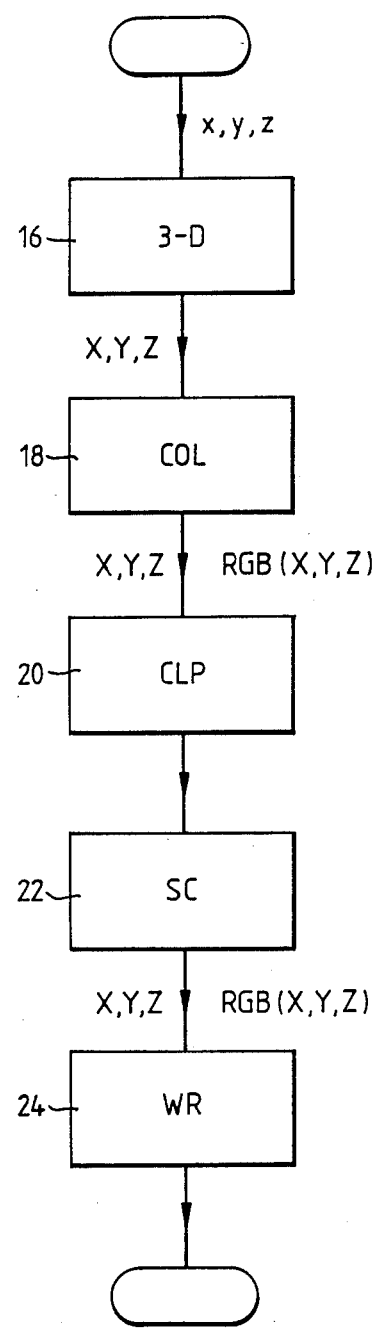
FIG. 2 is a flow chart showing a method of processing model data prior to display.

FIG. 2 is a flow diagram showing the process steps required to produce a frame of pixels from data input in the form of polygonal model data. That is, the scene to be depicted is described as a series of polygons, each stored as a list of coordinates (x,y,z) for each of its vertices, together with information on the colour and other attributes of the surface defined by the vertices. In block 16, three-dimensional geometric translations are performed on all the coordinates (x,y,z) of the models to determine their positions (X,Y) on the two-dimensional screen and their depth Z 'into' the screen. For simplicity, it is assumed for the purposes of this description that Z equals zero in the extreme foreground and increases into the distance. This is the convention usually adopted in the art, but of course the invention is readily adaptable to allow for different systems of representing the depth co-ordinate. The transformations will typically involve translation, rotation and perspective.

Next, in block 18, lighting values are used to vary the shading of each polygon, for example, in accordance with a predetermined lighting direction. In block 20, polygons which are transformed to positions (X,Y) wholly or partially outside the screen boundary are 'clipped' to the screen boundary to avoid wasting time processing redundant information.

In block 22, the polygons are 'scan converted' so that they may be drawn (block 24) into the display memory. Scan conversion is a process whereby the pixels covered by each polygon are written row by row and pixel by pixel, in the same way that the complete image will be scanned for output to the display. The colour values can then be read row by row from the video RAM at the display pixel rate, fed (via the CLUT 12 if required) to the digital to analogue converters and converted into video signals for display on the CRT screen.

Some of the blocks 16 to 24 may be implemented by software in a computer, but for high speed operation even a fast microprocessor will require assistance from specialised hardware. The scan conversion, for example, is in this embodiment implemented in the drawing hardware 8 to obtain sufficient speed for the display of real-time or near real-time moving images (i.e. several frames per second). This is particularly necessary as the scan conversion block 22 also includes processing to perform shading of objects to account for complex lighting information, as well as to perform hidden surface removal (HSR).

Figure 3:
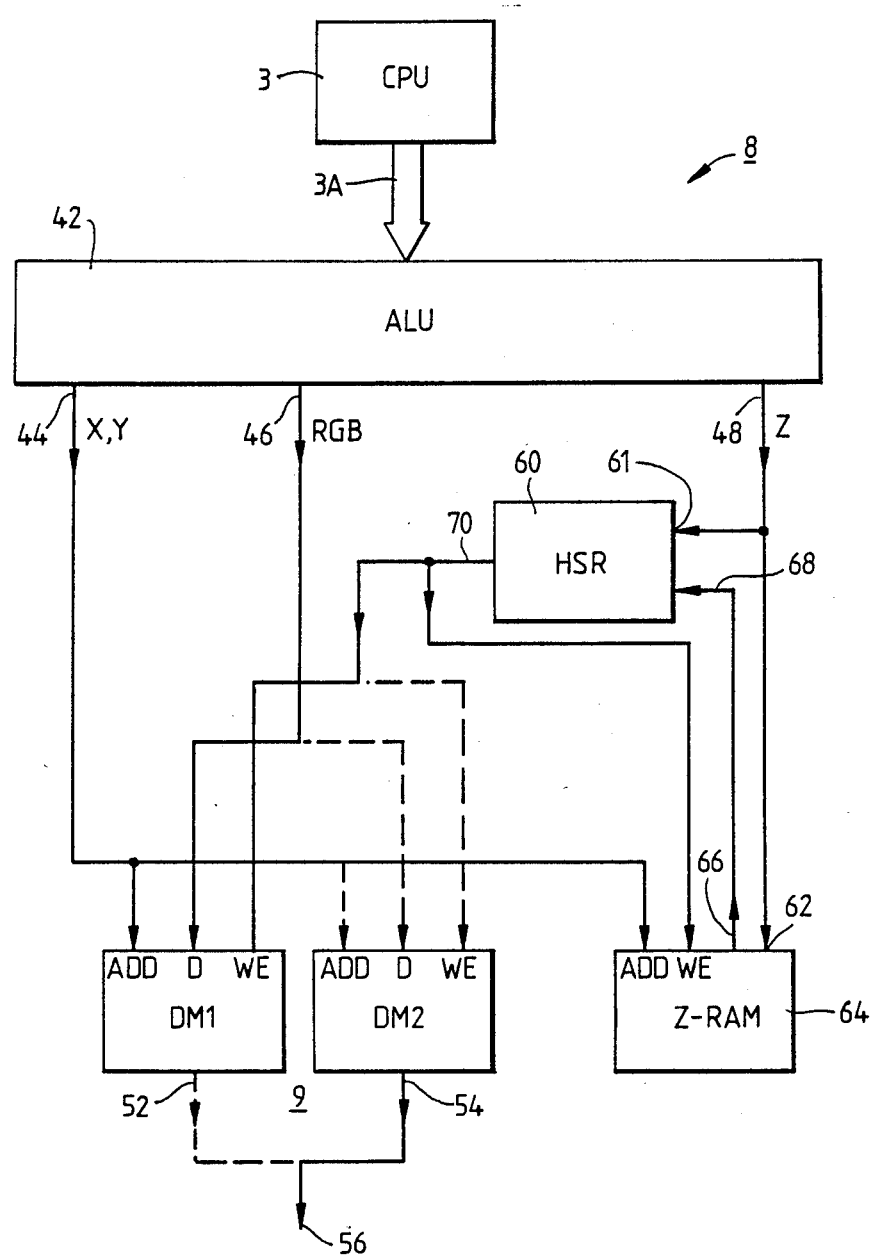
FIG. 3 is a schematic block diagram of a part of the system of FIG. 1.

FIG. 3 shows schematically the connections between the CPU 3, the drawing hardware 8 and the display memory 9 in the system of FIG. 1. The CPU 3 communicates via the bus 3A with an arithmetic and logic unit 42, which has an address (X,Y) output 44, a colour (RGB) output 46 and a depth (Z) output 48. The address (X,Y) is applied as required to the address inputs of the display memory 9 which in this embodiment comprises two separate display (colour) memories DM1 and DM2. The colour output 46 of the ALU 42 is applied alternately to data inputs of the memories DM1 and DM2.

Memories DM1 and DM2 have outputs 52 and 54 respectively which are alternately connected to an output 56 to provide (for example by means of the look-up table 12 and DAC's 13 R,G,B shown in FIG. 1) a video output signal. The video output scanning is performed, under control of the timing circuit 10 of FIG. 1, largely independently of the operations to write the data into the memories DM1 and DM2, since the output video signal is derived from one of the memories while data is being written into the other memory.

The Z output 48 of the ALU 42 provides a depth or z-value for every pixel addressed and is connected to a first input 61 of a hidden surface removal (HSR) control circuit 60 and to a data input 62 of a z-RAM 64. A separate data output 66 of the z-RAM 64 is connected to a second input 68 of the HSR circuit 60, which has an output 70 connected to write-enable inputs (WE) of both the colour RAM 9 (DM1/DM2) and the z-RAM 64.

In operation, the ALU 42 receives XYZ co-ordinates for the vertices of a polygon and colour/lighting information for that polygon, which will make up part of a final image. The ALU 42 includes the control circuitry required to perform the scan conversion which translates the area covered by the projection of the polygon in the X-Y plane into a sequence of pixel addresses X,Y according to a systematic line-by-line, pixel-by-pixel scan. This allows fast addressing of the memories 9, 64, because having set up an X,Y address for the first pixel in a series, it is then only necessary to increment the X (column) address to address each successive pixel in the same row (same Y). The known VRAM chips support this so-called 'page-mode' addressing to allow rapid reading and writing to their main DRAM array. For the Hitachi HM 53461P-10 VRAM, for example, a random (X,Y) read or write cycle will take 190 nanoseconds (ns), but a page mode read or write cycle for the next and subsequent pixels in the row ((x+1,Y) etc.) will take only 70 ns per pixel. Of course, the scan-conversion could be performed column-by-column and row-by-row, if desired, but in either case, it will normally be preferable to scan in the same orientation as the output scan to video is performed, particularly when updating the display memory has to be performed at the same time as the output scan. In this way, the input scan access requirements conflict as little as possible with the output scan requirements.

In the embodiment shown, the use of two memories DM1 and DM2 avoids the problem of conflict between the input to the memory and the continual output scanning, by use of a technique known as double-buffering. As illustrated by the connections shown by solid lines in FIG. 3, while a new image is being built up in DM1, the display device (connected to output 56) is being refreshed from an image stored in memory DM2. For the next frame, the connections to the memories are swapped, as shown by the dashed lines, and the display is refreshed from memory DM1 while the next frame image is built up in memory DM2. Thus the action of writing the pixel data into either memory DM1 or DM2 can be performed without interference with the output scan.

Of course the dual-ported VRAM chips described hereinbefore are specifically designed to allow updating an image stored in a single display memory while performing the output scan, it being necessary only to ensure that the drawing hardware does not write to a particular row while that row is being transferred to the shift register (SAM) to refresh the corresponding line of the display. However, double-buffering is still used in the present embodiment because of the possibility that some scenes may take longer than one screen refresh period to build up in the VRAM. In a single-buffered system, this would lead to disturbing effects on the display as the screen is first cleared to a background colour, and then various objects appear and disappear as the image is built up. Double-buffering allows a clean, instantaneous change from one scene to the next, allowing reasonable continuity to be achieved, for example for animation, even though the picture content changes only a few times per second. The invention is entirely compatible with either a two-memory (double-buffered) system or a single memory system, and in the following more detailed description, the detail of interaction with screen refresh functions will not be further described.

It will be apparent to those skilled in the art that the z-RAM 64 need not be doubled-buffered, since the same z-memory space can be used for every frame. This is because the z-values it contains do not need to be scanned to produce the two-dimensional display, they are used only to determine the final contents of the colour-RAM before displaying each frame.

Figure 4:
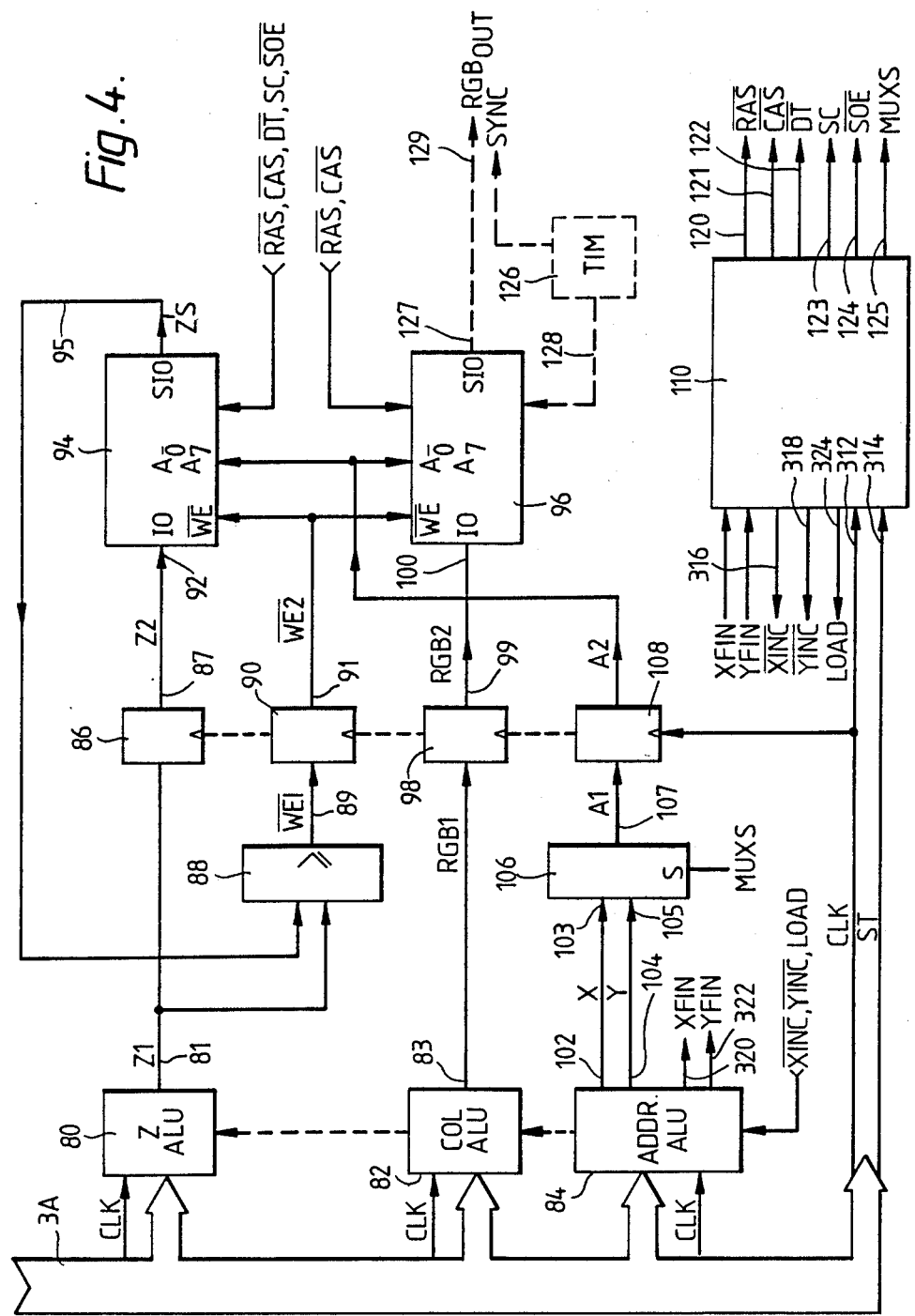
FIG. 4 is a more detailed circuit diagram of the part shown in FIG. 3.

FIG. 4 shows the circuit of the drawing hardware in more detail. The ALU 42 of FIG. 3 is formed by a z-ALU 80, a colour ALU 82 and an address ALU 84, which have data inputs connected to the CPU bus 3A. The bus 3A also provides signals to two inputs 312 (CLK) and 314 (START) of a logic sequencer 110. The sequencer 110 has three outputs 316 ($\overline{XINC}$), 318 ($\overline{YINC}$) and 324 ($\overline{LOAD}$) which are connected to inputs of the ALUs 80, 82 and 84, while the address ALU 84 has two outputs 320 ($\overline{XFIN}$) and 322 ($\overline{YFIN}$) which are connected to inputs of the sequencer 110. The z-ALU 80 has a 24-bit output 81 which is connected to an input of a first clocked latch 86 and to a first input of a 24-bit comparator 88. The comparator 88 has a single bit output 89 which is connected to an input of a second clocked latch 90. A 24-bit output 87 of the first latch 86 is connected to a 24-bit random access data input 92 of a dual ported video-RAM (VRAM) which forms a z-RAM 94. An output 95 of the SAM forming part of the z-RAM 94 is connected to a second input of the comparator 88, the ouput 95 being n-bits wide and carrying in operation a series of n-bit words representing the z-values of a series of pixels, where in this embodiment n=24. An output 91 of the second latch 90 is connected to a write-enable input of the z-RAM 94 and a write-enable input of a second dual-ported VRAM, colour-RAM 96.

The colour ALU 82 has a 24-bit digital RGB output 83 which is connected to an input of a third 24-bit clocked latch 98, which has a 24-bit output 99 connected to a 24-bit random access data input 100 of the colour-RAM 96. The address ALU 84 has two address outputs 102 and 104 (X and Y respectively) which are connected to respective inputs 103 and 105 of an address multiplexer 106. The multiplexer 106 has an address output 107 which is connected to address inputs of both the z-RAM 94 and the colour-RAM 96 via a fourth clocked latch 108. The clocked latches may, for example, be constructed using TTL or Fast TTL i.c.'s such as Signetics' 74374/74F374.

The sequencer 110 has logic outputs 120-124 ($\overline{RAS}$, $\overline{CAS}$, $\overline{DT}$, SC and $\overline{SOE}$), which are connected to control inputs of the z-RAM 94 and/or colour-RAM 96 as shown, and a further logic output 125 (MUXS) which is connected to a selecting input of multiplexer 106. The form of the signals produced at these outputs will be described hereinafter, with reference to FIG. 5. The sequencer 110 may be a custom-built circuit using TTL components, for example, but in this embodiment the sequencer 110 comprises a field programmable logic sequencer (FPLS) with additional logic gates as described hereinafter. The FPLS comprises one or more FPLS chips such as Signetics' PLS105, which contains a field-programmable logic array (FPLA) together with feedback registers to provide a direct implementation of a synchronous state machine. Additonal logic gates are used to drive outputs 121 ($\overline{CAS}$) and 123 (SC) by gating outputs of the FPLS with a free-running clock signal (CLK).

As described hereinbefore with reference to FIG. 3, the colour-RAM 96 is actually one of two memories (DM1 and DM2) which are used alternately. A display timing circuit 126 (shown dotted) is equivalent to circuit 10 in FIG. 1 and is connected at 128 to control inputs of the colour RAM 96. A 24-bit serial RGB output 129 is connected to a data output 127 (SIO) of the colour-RAM 96 (shown dotted, as in FIG. 3) for refreshing the display in alternate frame periods. These features of construction and operation are transparent to the drawing hardware. The serial access memory (SAM) and serial port (SIO) of the colour-RAM 96 are used in the conventional manner to transfer a line of pixels from the main DRAM array and shift the colour values out, pixel-by-pixel in response to address and clock signals from the circuit 126. These operations are fully described in the manufacturer's data sheet for the VRAM chosen, for example the Hitachi HM53461P. The timing control circuit 126 may be implemented using a commercially available Video System Controller chip such as Texas Instruments' TMS 34061, which can make use of the features of the known dual-ported VRAM chips.

The names used in this description for the inputs and outputs of the RAMs 94 and 96 are those used in the above mentioned data sheet. Similar devices are available from other manufacturers which have very similar inputs and outputs, but with slightly different names. Examples are the Fujitsu MB81461 and Advanced Micro Devices' Am90C644. All three devices have a main DRAM array of 65536 (64 K) locations, each holding 4 bits of data. Thus, to hold, for example, a 24-bit z-value and a 24-bit colour value (double-buffered) for each of 64 K pixels requires $(24+(2\times24))/4$ or eighteen VRAM chips of the type described, six for the z-RAM and six for each colour-RAM (DM1 and DM2).

Each 64 K array is arranged in 256 rows by 256 columns of 4-bit locations, each addressed by means of an 8-bit row address (RA) and an 8-bit column address (CA), which are applied in turn to the 8-bit address input ($A_0$-$A_7$) of the chip. The serial access memory (SAM) is a 256 by 4-bit shift register, clocked by an independent serial clock input SC and providing an independent 4-bit output at serial output SIO. Any row of 256 4-bit data can be transferred to the SAM from the DRAM array (Read Transfer Cycle - RTC), with the row to be transferred and the starting column specified by RA and CA respectively. The 4-bit data transferred from the starting column location are immediately available at serial output SIO, and those of the next successive locations are available in series in response to successive rising edges at the serial clock input SC. In this simple embodiment, the 256 by 256 locations correspond directly to a square display of 256 by 256 pixels, with pixel addresses (X,Y) being equivalent to array addresses (CA,RA).

In order to initiate the drawing of a triangular or quadrilateral shape by the hardware of FIG. 4, the CPU 3 (FIGS. 1,3) loads the ALUs 80, 82, 84 with parameters defining the shape via the bus 3A. In this embodiment, the parameters loaded into the address ALU 84 are the starting row (top Y), finishing row (bottom Y), the boundaries of the shape within the starting row (left X, right X) and the slope of the left hand and right hand edges of the shape (left X increment and right X increment). The address ALU 84 contains the necessary incrementers and counters then required to generate the pixel addresses (X,Y) required to scan the area of the shape, under control of the sequencer 110.

Similarly, the z-ALU 80 is loaded with an initial z-value for the shape, and with slopes for Z in the X-direction (along the rows) and in the Y-direction (down the columns). The colour ALU 82 is loaded with RGB colour values for the top left pixel and 'slopes' for the RGB values in the X- and Y-directions, to allow a gradual variation of shading across the surface of the shape to be obtained.

Once these initial values and slope parameters have been supplied to the ALUs via the bus 3A, the CPU 3 causes a start signal ST to be applied to the input 314 of the sequencer 110, and the circuit of FIG. 4 then operates substantially autonomously, synchronously with the cycles of a clock signal CLK at 312, to draw the complete shape without further reference to the CPU 3, as follows.

Upon receiving the signal ST from the bus 3A, the sequencer 110 generates a signal LOAD at its output 324, which causes the ALUs 80, 82, 84 to transfer to their respective counters and incrementers the values for X,Y,Z and colour for the first pixel in the first series to be written.

Figure 5:
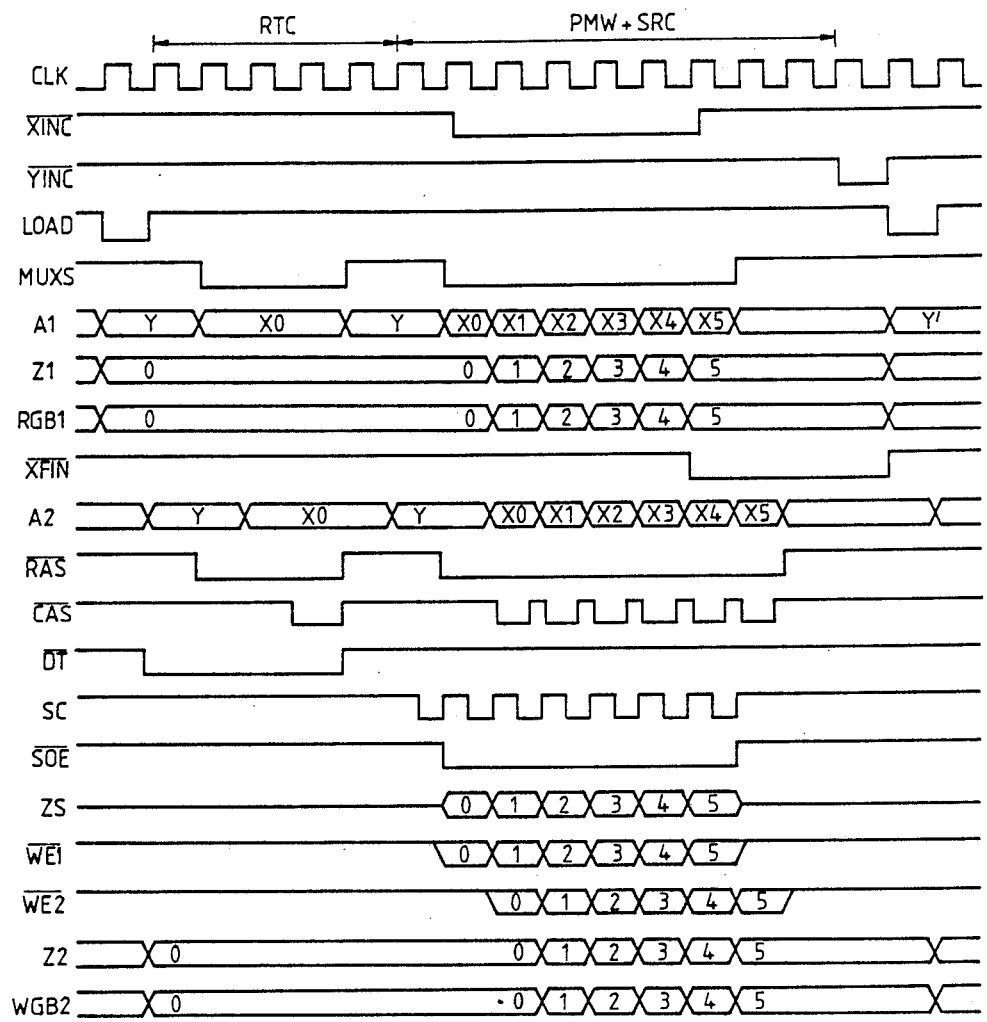
FIG. 5 shows waveforms at various points in the circuit of FIG. 4.

The operation of the circuit of FIG. 4 to write a representative series of pixels into the colour-RAM 96 in accordance with the present invention will now be described, with reference also to the waveform diagram of FIG. 5. In the particular example of the sequence shown in FIG. 5, six pixels in a row Y are to be modified in accordance with a z-buffer algorithm, starting with the pixel at address (XO,Y) and finishing with the pixel at address (X5,Y). In response to the signal LOAD from the sequencer 110, the address ALU 84 generates at its outputs 102, 104 the address (XO,Y), and the z-ALU 80 generates a signal Z1 at its output 81 while the colour ALU 82 generates a signal RGB1 at its output 83. Signals Z1 and RGB1 at this time are the input z-value and input colour value respectively for the pixel (XO,Y).

The sequence required to write the series comprises two distinct memory cycles. Firstly, a Read Transfer Cycle transfers the current z-values for the row Y from the main DRAM array into the SAM (shift register) of the z-RAM 94. The row (or screen line) is specified by the 8-bit Y-output 104 of the address ALU 84 via the multiplexer 106. The sequencer 110 makes MUXS high so that a signal A1 equal to Y at the output 107 of the multiplexer is applied to the input of latch 108 and a signal A2 emerges from the latch 108 one clock cycle later and is applied to the address inputs $A_0$–$A_7$ of both the z-RAM 94 and the colour-RAM 96. With $\overline{DT}$ low, to indicate data transfer, the row address strobe $\overline{RAS}$ goes low to latch the address of the row Y in the z-RAM. MUXS then goes low and the address XO of the starting pixel of the series then similarly becomes A1, then A2 and is latched by the z-RAM as the column address of the starting pixel, $\overline{DT}$ returns high and the z-values for the row Y are transferred to the SAM, with that for the first pixel (XO,Y) being available as a 24-bit parallel signal ZS at the SIO of the z-RAM 94 as soon as serial output enable $\overline{SOE}$ is made low by the sequencer 110.

Secondly, the new data is processed and the pixels are written using a Page Mode Write cycle (PMW), in conjunction with Serial Read Cycles (SRC) for reading the current z-values. To achieve this, the sequencer 110 makes MUXS high again, and $\overline{RAS}$ is made low, (with $\overline{DT}$ high this time) to address the row Y in the DRAM array. Next the sequencer 110 makes MUXS go low and subsequently makes signal $\overline{XINC}$ go low, which enables clocking (synchronous with CLK) of the internal incrementers and counters within the ALUs 80, 82, 84. Thus the address ALU 84 produces at its output 102 the successive addresses X1, X2, X3, etc., while the z-ALU 80 generates the corresponding input z-values at its output 81 and the colour ALU 84 generates the corresponding input colour values at its output 83.

The signals Z1, RGB1, A1 generated by the ALUs are then delayed by the latches 86, 90, 108 to become Z2, RGB2, A2 respectively, and to be applied to the inputs of the RAMs 94 and 96. Synchronously with the arrival of the X-addresses (A2) at the address inputs $A_0$–$A_7$ of the z-RAM 94 and colour-RAM 96, the sequencer 110 toggles the column address strobe input ($\overline{CAS}$) of the RAMs 94 and 96 to address the individual pixel locations XO, X1, X2 etc. in the row Y of the DRAM array. This implements the Page Mode Write cycles which modify the contents of the DRAM array conditionally on the value of the write enable ($\overline{WE}$) input of the RAMs 94 and 96.

To implement the z-buffer algorithm during the PMW cycle, the sequencer 110 toggles the serial clock SC to the z-RAM while $\overline{SOE}$ is held low in order to shift the current z-values ZS out of the serial port (Serial Read Cycles) simultaneously with the generation of the input z-values Z1 at the output 81 of the z-ALU 80. The 24-bit comparator 88 can then compare the input and current z-values for each pixel 0–5 in turn and generate a write-enable signal $\overline{WE1}$ at its output 89.

Signal $\overline{WE1}$ then undergoes a clock cycle's delay as it passes through the latch 90 to become $\overline{WE2}$. Thus, at the same time as the addresses XO–X5 are supplied to the z-RAM 94 and colour-RAM 96 (signal A2), the input values Z2 and RGB2 are applied to the corresponding DRAM ports 92,100, and $\overline{WE2}$ is applied to the write-enable input $\overline{WE}$ of each RAM, to define whether the data (Z2, RGB2) are written or not, that is to say whether the input pixel is visible or not in the desired two-dimensional image.

Without the read-out of the current z-values for one pixel being performed simultaneously with the writing of those for the previous pixel, the shortest cycle time per input pixel would be substantially doubled, even using the same hardware, as illustrated by the following example. Using the Hitachi HM53461P-10 VRAM in page mode, the write cycle time is 70 ns and the Serial Read cycle time is 40 ns. The time taken to compare two z-values is 28 ns, using for example fast-TTL 74F85 comparator chips. This requires a total cycle time of 40+28+70=138 ns to perform the read, compare and write operations for each pixel. However, using the arrangement described with reference to FIGS. 4 and 5, apart from an extra cycle's set-up time at the start of the series, the pixel cycle time for each pixel is only 70 ns, namely the Page Mode Write cycle time, since the read and compare operations (taking 40+28=68 ns) have already been performed during the 70 ns write cycle of the previous pixel. Thus, particularly since series of pixels will generally be longer than the six pixels of the example—perhaps a few hundred pixels—the use of the invention provides z-buffered writing without any significant loss of speed. Furthermore, this is achieved economically using standard hardware components.

If the total time taken for the read and compare operations is longer than one write cycle time (longer than 70 ns in the above example), the invention may still be implemented, by using an extra set of clocked latches to delay the input data by an additional clock cycle. This allows the time for reading and comparing to be spread over two write cycle time periods if necessary.

The sequencer 110 holds $\overline{XINC}$ low until the address ALU 84 signals via its output 320 ($\overline{XFIN}$) that the X address within the row Y has reached its final value (right X). Since this indicates the end of the series, $\overline{XINC}$ returns high and the sequencer 110 strobes its output 318 ($\overline{YINC}$) to cause the address ALU 84 to update its row counter Y and to cause the z- and colour ALUs 80, 82 to update their incrementers according to the preset 'slope' values for Z and colour in the Y-direction. Then the sequencer 110 makes its output 324 ($\overline{LOAD}$) go low, causing these new values to be transferred to the output counters and incrementers of the ALUs 80, 82, 84 and the sequence just described with reference to FIG. 5 repeats itself for the pixels of the next series. When all the rows of the shape have been processed, the address ALU 84 detects that its Y address matches the preset final Y value (bottom Y) and generates a signal at its output 322 ($\overline{YFIN}$) to stop the sequencer 110 generating signals to process any further series. The ALU 84 or the sequencer 110 may then communicate if desired with the CPU 3 via the bus 3A to inform it that the shape has been written.

Displays having higher resolutions than 256 by 256 pixels can of course be driven using more memory chips and a suitably enlarged address space. For example, to display 256 rows by 512 pixels, the eighteen 4×64 K chips may be doubled in number and addressed so as to divide each row of 512 pixels (0–511) between two groups of chips. One group of chips may serve pixels 0–255 on each row while the other group serves pixels 256–511. To allow greater speed, however, one group may serve the even-numbered pixels 0–510 while the other serves the odd-numbered pixels 1–511. This allows interleaving of the writing operation so that, although each group can only operate at 14 MHz (70 ns cycle time), writing to the two groups alternately with staggered timing can achieve an effective 28 MHz pixel rate. Output scanning may also be interleaved to achieve a display pixel rate of up to 50 MHz (serial read cycle time 40 ns). Extension of the number of rows is of course equally straightforward, with or without interleaving of the row addresses.

From reading the present disclosure, other modifications will be apparent to persons skilled in the art. Such modifications may involve other features which are already known in the design and use of graphics systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An apparatus for modifying data stored in a random access memory, the data corresponding to one or more rows of pixels of a stored image, the memory comprising a first memory (colour RAM) for storing a colour value for each pixel and a second memory (z-RAM) for storing a depth (z) value for each pixel, the apparatus comprising:
   means for receiving input data defining: addresses, colour values, and depth (z) values, which input data corresponds to a series of pixels;
   means for successively selecting each pixel in the series and synchronously supplying the corresponding addresses, input colour values, and input z-values;
   means for applying the corresponding address of each selected pixel to address inputs of the z-RAM and colour-RAM;
   means for reading from the z-RAM a currently stored z-value for each selected pixel;
   means for comparing the currently stored z-value with the corresponding input z-value for each selected pixel;
   means for writing the corresponding input z-values for each selected pixel into the addressed location of the z-RAM and for writing the corresponding input colour values into the addressed location of the colour-RAM, said writing means, responsive to an output of the comparing means, writing the corresponding input colour value into the colour-RAM and the corresponding input z-value into the z-RAM, to define a new stored colour value and a new stored z-value for a given selected pixel if the corresponding input z-value represents a lesser depth than the currently stored z-value for that pixel;
   wherein:
   (a) the z-RAM comprises: (i) a main random access array, and (ii) a serial access memory;
   (b) the apparatus further comprises means responsive to the input data for transferring the currently stored z-values for all pixels in the series from the main array of the z-RAM into the serial access memory of the z-RAM; and
   (c) the reading means reads the currently stored z-value of a succeeding pixel in the series from an output of the serial access memory, while the corresponding input values for the given pixel are being written into the colour-RAM and the main array of the z-RAM.

2. An apparatus as claimed in claim 1, wherein the succeeding pixel is the next pixel in the series.

3. An apparatus as claimed in claim 1, wherein the means for applying the address of each selected pixel includes means for applying clock signals to the serial access memory to make the currently stored z-value for each successive pixel available in turn at the output of the serial access memory.

4. An apparatus as claimed in claim 1 wherein the comparing means comprises a digital comparator having a first input connected to the means for generating the successive input z-values and a second input for connection to the output of the serial access memory of the z-RAM.

5. An apparatus as claimed in claim 4 comprising means for connecting an output of the comparator to write-enable inputs of the z-RAM and colour-RAM.

6. An apparatus as claimed in claim 1 comprising one or more clocked latches for synchronising data applied to the colour-RAM and z-RAM with the signals applied to the address inputs of the colour-RAM and z-RAM respectively and with signals applied to control inputs of those RAMs.

7. An apparatus as claimed in claim 1 comprising a sequencing circuit for applying control signals to the colour-RAM and z-RAM synchronously with the selection of the pixels of the series.

8. An apparatus as claimed in claim 1, wherein the colour-RAM comprises a main random access array and a serial access memory, the means for writing the input colour values into the colour-RAM being arranged for connection to the main array of the colour-RAM, the apparatus further comprising a picture output arranged for connection to the output of the serial access memory of the colour-RAM.

9. An apparatus as claimed in claim 1, wherein the colour-RAM and z-RAM comprise one or more identical integrated circuit memories.

10. An electronic graphics system including an apparatus as claimed in claim 1.

11. The system of claim 10 further comprising:
   (a) a keyboard, coupled with the modifying apparatus;
   (b) a graphic digitiser tablet, coupled with the modifying apparatus;
   (c) a central processing unit, coupled with the modifying apparatus; and
   (d) a display unit, coupled with the modifying apparatus.

* * * * *